United States Patent [19]

Li

[11] Patent Number: 5,635,926
[45] Date of Patent: Jun. 3, 1997

[54] POINTING AND/OR DIRECTIONAL CONTROL DEVICE FOR CONTROLLING THE MOVEMENT AND POSITIONING OF AN OBJECT

[76] Inventor: Kenneth K. Li, 217 Laurel Ave., Arcadia, Calif. 91006

[21] Appl. No.: 284,798

[22] Filed: Aug. 2, 1994

[51] Int. Cl.[6] .................................................. G09G 3/02
[52] U.S. Cl. ........................ 341/20; 345/162; 74/471 XY
[58] Field of Search .............................. 341/35, 20, 176, 341/173, 22, 34; 345/163; 235/145 R; 74/471 XY

[56] References Cited

U.S. PATENT DOCUMENTS 5,270,690  12/1993  Oberg .................................... 345/163
5,448,240   9/1995  Morita ..................................... 341/35

Primary Examiner—Jeffery Hofsass
Assistant Examiner—Albert K. Wong
Attorney, Agent, or Firm—Nicholas J. Skarlatos

[57] ABSTRACT

The present invention provides a pointing and/or directional control device for controlling movement and positioning of an object in at least two dimensions which, in the preferred embodiment, forms a cursor control device for use in a computer system. The device comprises at least a cylindrical roller disposed in a recess of keyboard housing proximate and substantially parallel to the space bar key of the keyboard, a first decoder comprising a first disc coupled to the roller with gearing to impart rotational movement to the first disc upon sliding of the roller laterally from end to end and a sensor coupled to the first disc for generating electronic signals corresponding to the magnitude and direction of disc rotation, a second decoder comprising a second disc coupled to the roller with gearing to impart rotational movement to the second disc upon rotation of the roller about its longitudinal axis and a sensor coupled to the second disc for generating electronic signals corresponding to the magnitude and direction of disc rotation and signal conversion circuitry for receiving the electronic signals output by the first and second decoders and generating as output tracking signals to control the movement and positioning of the object.

16 Claims, 4 Drawing Sheets

POINTING AND/OR DIRECTIONAL CONTROL DEVICE FOR CONTROLLING THE MOVEMENT AND POSITIONING OF AN OBJECT

BACKGROUND OF THE INVENTION

(1) Field of the Invention

The present invention relates to the field of pointing and/or directional control devices, and more specifically, to both absolute and relative pointing devices designed to control the positioning and movement of both two dimensional and three dimensional objects.

(2) Prior Art

Pointing devices have been in wide use for sometime now in a variety of applications which in some way require control over the movement and/or positioning of an object. Among other uses, these devices have proved to be particularly beneficial in both the manufacturing and computer industries where the signals output by the devices can be used to control the movement, positioning, and in some cases, the operation of machines and visual images.

Pointing devices are usually classified as either absolute or relative. Absolute pointing devices are those which associate the position of the object with the location of the pointing device itself, whereas relative pointing devices associate the movement of the object with the movement of the device regardless of its position. In some applications, however, a single device can control both the movement and location of the object in addition to the magnitude of its displacement (i.e., speed).

Most pointing devices can be categorized into the following types:

1. Digitizing or Graphics Tablets

These can be either absolute or relative pointing devices which comprise a planar tablet having a surface area divided into distinct grids with sensors placed on the grids in a predetermined pattern for sensing the placement of a usually rod-like pointer (or "pen") held by the user or the finger itself. The location of the device is translated into a specific object position by movement of the pen or finger on the surface of the tablet. Such devices are commonly referred to as "digitizing tablets" when placed on a table-top, or as "touch screens" when placed in front of a monitor screen. Detection is normally accomplished through the use of a plurality capacitive sensors, heat sensors, pressure sensors or electrical sensors which detect contact with the pointer or an electrical output therefrom. Some type of logic means is used to convert the signals generated by the sensors into the X and Y coordinates, or an amount of movement of the pen or finger with respect to the grids of the tablet. Position selection is performed by activating a button either at the tip of the pointer or on the side of the tablet.

2. Joysticks

Joysticks may be used as either absolute or relative pointing devices depending upon its application. These devices consist of a box with a control stem protruding from the center of the box for manipulation by the user's hand. The angular movement and/or position of the stem in any direction is detected by coupling the base of the stem to digital decoders forming X and Y rotational sensors implemented in the bottom of the box. Movement of the stem in any direction causes the rotational sensors to generate electronic vector signals that track the displacement along two axis, while more sophisticated joysticks generate signals which also vary in magnitude with the angular displacement of the stem. The movement of the joystick is normally associated with the movement of an object on a computer screen such as a cursor or an airplane, however, it can also be used to select specific locations on the screen by associating the stem's position with a coordinate position on the screen. Selection is performed by activating one or more buttons located on the stem of the joystick.

3. Mouse/trackball

These are relative pointing devices which measure movement of a sphere disposed either at the bottom of a movable "mouse" housing or on the top of stationary "trackball" housing. The rotational movement of the sphere is mapped to the linear movement of an on-screen object using X and Y rotational decoders. The decoders each comprise a roller disposed orthogonally with respect to each other and in constant contact with the surface of the sphere. Each sensor further comprises an axle connecting the roller to a slotted disk and optical sensors placed proximate to the disk for detecting the rotational and directional displacement of the radial slots as the sphere is moved. The optical sensors have their outputs coupled to signal generation circuitry within the housing of the mouse or trackball for conversion of the displacement into digital signals. Again, selection is performed by activating one or more buttons on the housing of the device.

When these pointing devices are used in conjunction with a computer system, they are usually physically separated from the main component housings but connected thereto via a serial cable. In the more recent "notebook" type computers, however, these devices are often incorporated within the computer's keyboard housing. In this manner, a mouse, trackball or small joystick can be made integral with the surface of the keyboard to facilitate operation of the device by reducing the distance the user must traverse with his hand to reach the device. Furthermore, these devices may alternately be implemented in a base pivotally attached to the side of the keyboard so as to reduce the overall surface area of the keyboard.

Although pointing devices implemented as an integral element of a keyboard housing help to minimize the distance the user must traverse his hand between the keys and the device, each of the above described pointing devices still requires the user to remove his fingers from the keys and reposition his hand over the device in order to manipulate it and activate the command buttons. Hence, a major drawback with such devices is that they require the user to interrupt his typing activity to manipulate the device, thereby hindering his typing ability and causing excessive fatigue to his wrist.

SUMMARY OF THE INVENTION

Accordingly, it would be desirable to provide a pointing and/or directional control device designed and situated such that the user need not remove his hands or fingers from the keyboard in order to manipulate the device.

It is therefore an object of the present invention to provide a pointing and/or directional control device comprising at least a roller rotatable about and slideable along its longitudinal axis by means of a user's thumbs and/or fingers and two orthogonal decoders either optically or mechanically coupled to the roller for generating tracking signals that enable control over an object in two and three dimensions.

It is another object of the present invention to provide a pointing and/or directional control device as described above forming a cursor control device for use in a computer system, the roller of the device being disposed within a recess of a keyboard housing such that it is situated proximate and parallel to the space bar of the keyboard.

It is yet another object of the present invention to provide a pointing and/or directional control device as described above having means for position selection and command activation comprising at least one contact switch disposed beneath the roller or a platform on which the roller is supported whereby position selection and command activation are accomplished by depressing either the roller or the platform.

It is yet another object of the present invention to provide a pointing and/or directional control device as described above for use in a variety of applications including inter alia implementation in computer keyboards, hand-held remote control units and the steering wheel or shifting lever of an automobile for control over the movement and positioning of an on-screen object or of three dimensional objects.

These and other objects are accomplished by providing a pointing and/or directional control device having a cylindrical roller disposed within a recess of or on top of a housing surface. The roller is preferably supported by guide members and is both rotatable about and translatable along its longitudinal axis. In the preferred embodiment, a first decoder comprising a first disc is coupled to the roller with gearing to impart rotational movement to the first disc upon sliding of the roller laterally from end to end. The first decoder also includes a sensor coupled to the first disc for generating electronic signals corresponding to the magnitude and direction of disc rotation. Similarly, a second decoder comprising a second disc is coupled to the roller with gearing to impart rotational movement to the second disc upon rotation of the roller about the longitudinal axis. Again, the second decoder further includes a sensor coupled to the second disc for generating electronic signals corresponding to the magnitude and direction of disc rotation.

The guide members are preferably connected to contact switches disposed proximate to or underneath the roller to enable position selection and command activation upon depressing the roller. Alternatively, the roller, decoders and guide members may be integrally formed on a platform having the contact switches disposed thereunder for unified movement of the assembly in activating the switches. Additionally, signal conversion circuitry is provided for receiving the electronic signals output by the first and second decoders and a command signal output by the contact switch and generating as output tracking and selection signals which control the movement and positioning of the object.

This device can be advantageously used in a plurality of applications where control over the movement and positioning of an object is desired, including among other things application to the keyboard of a computer system, application to the steering wheel or shifting lever of an automobile and application to a remote control unit of a remote control system.

DETAILED DESCRIPTION OF THE INVENTION

The present invention provides a pointing and/or directional control device which, in the preferred embodiment, is designed for use with a keyboard in such a manner that the user need not remove his hands or fingers from the keyboard in order to manipulate the device. In the following description, for purposes of explanation and not limitation, specific details are set forth, such as preferred structures and compositions, particular dimensions, etc. in order to provide a thorough understanding of the present invention. However, it will be apparent to one skilled in the art that the present invention may be practiced in other embodiments that depart from these specific details. In other instances, detailed descriptions of well-known devices, characteristics and techniques are omitted so as not to obscure the description of the present invention with unnecessary details.

Figure 1A:
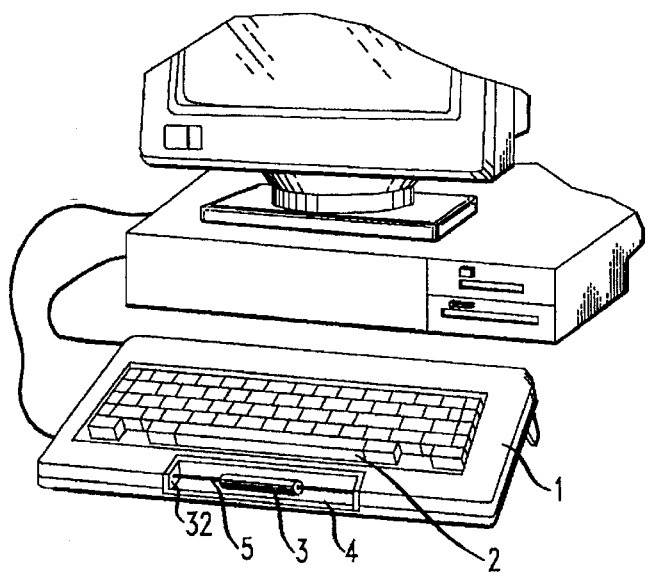
FIG. 1(a) is a diagram showing the present invention comprising a roller and platform assembly incorporated into a computer keyboard.

In accordance with the preferred embodiment of the present invention shown in FIG. 1(a), the pointing device is used as a cursor control device and is structurally implemented within a recess of a keyboard housing 1 at the lower edge adjacent and parallel to the space bar 2. The device preferably comprises a platform assembly having a cylindrical roller 3 for controlling movement and positioning of an on-screen object, a support carriage or platform 4 for retaining and coupling the roller to the keyboard housing, a support shaft 5 and guide combination for rotatably coupling the roller to the platform 4 and one or more contact switches 17 interposed between the bottom of the platform and the keyboard housing 1 for selection activation.

Figure 1B:
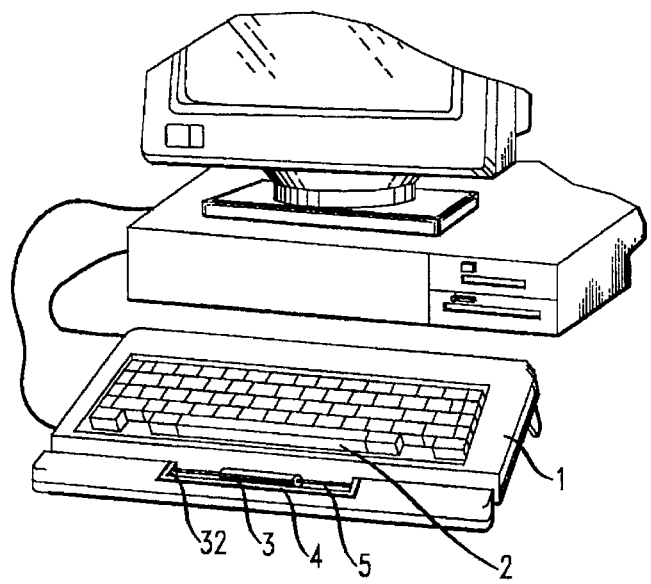
FIG. 1(b) is a diagram showing the present invention comprising a roller and platform assembly incorporated into a wrist support pad associated with a computer keyboard.

The platform 4 comprises a generally rectangular body having a generally rectangular or arcuate recess formed along the lower longitudinal edge of the rectangular body which thus forms the lower edge of the keyboard. With the arrangement shown in FIG. 1(a), a central portion of the lower edge of the keyboard is removed to expose the roller and facilitate its movement. In the alternate embodiment shown in FIG. 1(b), however, the platform assembly described above is implemented within the top surface or a top edge of a wrist support pad 30 disposed at the lower edge of a computer keyboard 1 in order to avoid having to replace an existing keyboard 1 to utilize the new device. This feature not only eliminates the need for an entirely new keyboard, but at the same time significantly reduces the strain and fatigue on the user's wrists.

In either of the embodiments described above, the roller 3 itself comprises a substantially cylindrical member securely fastened to the support shaft 5 such that the shaft 5 is coincident with the longitudinal axis of the roller 3. To freely support the roller 3 within the recess, the shaft 5 is movably secured to two guides 32 preferably forming apertures formed in the side faces of the platform 4. Nonetheless, the guides may also comprise stems each having a first end affixed to the top surface of the platform and a second end adapted with an eyelet or the like for reception of the shaft 5. To facilitate movement of the roller 3, its surface 6 is preferably coated with a textured, ribbed or rubbery material to better enable gripping by the user's thumbs or other fingers.

Figure 2:
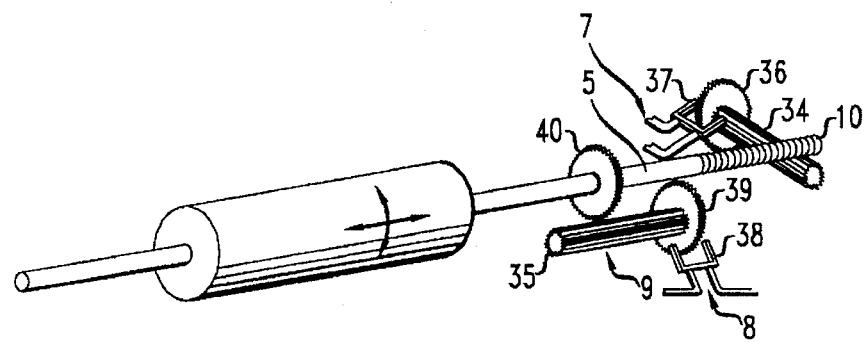
FIG. 2 is a diagram showing the connections between the roller and the X & Y decoders.

To generate the output tracking signals, which control the movement and positioning of the on-screen object in two dimensions, the roller is rotated about its longitudinal axis to move the object vertically and slid from side to side to move the object horizontally. Referring to FIG. 2, two digital decoders 7, 8 are coupled to corresponding geared and threaded portions 9, 10 of the shaft 5 preferably disposed within the non-recessed portion of the platform in the preferred embodiment (i.e., within the platform housing disposed at one end of the platform 4). An X decoder 7 is coupled to the shaft 5 by providing a first portion of the shaft 5 with a plurality of circumferential threads or ridges 10 and transversely connecting gearing thereto to translate the sliding movement of the roller into rotational movement. In one embodiment, the gearing preferably comprises at least one toothed shaft 34 having a disc 36 affixed to one end of the shaft with a plurality of radial slots formed in the disc 36 to enable detection of the rotational displacement and direction by optical sensors 37 of the decoder 7. The gearing may further include intermediate toothed wheels having smaller diameters for amplification of the rotational displacement to obtain a higher degree of control over the object.

The Y decoder 8 is also coupled to the shaft 5 by providing a second portion of the shaft 5 with gearing. This gearing preferably comprises a toothed wheel 40 coupled to another toothed shaft 35 to convey the rotational movement of the shaft 5 to the toothed shaft 35. As with the X decoder, the toothed shaft 35 of the Y decoder 8 also comprises a disc 39 affixed to one end and having radial slots to enable detection of the rotational displacement and direction by an optical sensor 38. The gearing mentioned here can also be implemented through the use of wheels and shafts having non-slippery surfaces instead of teeth and ridges.

Figure 3:
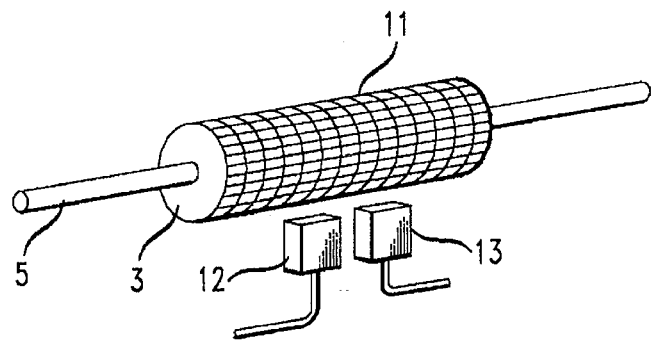
FIG. 3 is a diagram showing the roller having its surface adapted with vertical lines of a first color and horizontal lines of a second color for detection by the X and Y decoders.

According to an alternate embodiment of the detection means, shown in FIG. 3, the roller itself may form part of the decoding means via implementation of a grid system 11 on the surface of the roller 3 and optical sensors 12, 13 placed in the recess of the platform or other housing just below the roller 3. The horizontal and vertical lines of the grid comprise different colors such that the rotational and translational movements of the roller can be separately detected by optical sensors 12, 13 having different colored filters. The amount of movement of the roller 3 is sensed by detecting the number of lines passing through the optical sensors 12, 13. In this embodiment, the device need not include the support shaft 5 as the roller 3 can be elongated and coupled to the guides itself, or alternatively, seated completely within an arcuate recess having apertures formed in the arcuate surface of the recess for placement of the optical sensors 12, 13.

With respect to the specific sensors and signal generation circuitry of the decoders utilized in the preferred embodiment, they are fashioned after those of conventional cursor control devices such as mice and trackballs in order that the present invention can be used interchangeably with those devices in a computer system by replacement of the existing keyboard and pointing device. Similar to the mouse and trackball type devices, the tracking signals output by the device are continuously generated with movement of the roller and may need to be amplified to enable finer control over the movement of the object (i.e., higher resolution). This can be achieved either through mechanical amplification by means of the gearing or through electronic amplification where extra circuitry is used to amplify the magnitude of the output tracking signals.

Additionally, the serial tracking signals output from sensors of the present invention are coupled to the appropriate signal bus of the computer system (not shown) via signal lines internal to the keyboard housing. These signal lines should be slackened within the housing of the support platform to permit unhindered vertical movement of the platform for command activation. The signals lines are coupled to the appropriate signal bus of a computer by running them along the already existent serial connection of the keyboard to the system. In the case of PC-type computers which have a dedicated input slot for a cursor control device, the signal lines for the device must be separated from those of the keyboard at the CPU interface to enable a separate input connection. However, for other computers in which the cursor control device is coupled directly to the keyboard, the signal lines of the present invention are then multiplexed with the keyboard control signal lines in the same way as with conventional devices of this type.

Movement of the on-screen object is proportional in magnitude and direction to the amount and direction of rotation and sliding of the roller, with diagonal movement of the object being accomplished by a combination of both rotation and sliding. Because rotational movement of the roller is infinite in either direction, no initialization is required (such as with mice or trackballs) to coincide the movement of the device with the on-screen object. However, the lateral sliding movement of the roller is limited in each direction such that the roller may be at one of its limits (left or right) while the object is somewhere in the middle of the computer screen.

To resolve this problem, the user simply moves the roller 3 all the way to the other limit in the opposite direction. This initializes the system, and the roller 3 will then be able to accommodate the full cursor range of the entire screen. The reason is as follows: Since the roller 3 reaches its physical limit before the cursor reaches its limit on the screen when moved in one direction, movement of the roller 3 in the opposite direction will cause the cursor to reach its limit on the screen before the roller 3 does. When the roller 3 continues to move in the opposite direction, the signal will be ignored by the software since the cursor has already reached its limit, and the proper correspondence between the roller 3 and cursor will be established. (This is the same situation as when the cursor reaches one side and the mouse continues to move in that direction.) An alternative to this initialization method is to provide contact switches (not shown) on opposite vertical sidewalls of the platform 4 (forming the inner walls of the platform recess) to enable contact between the switches and the lateral ends of the support shaft 5 when the support shaft 5 is moved to one of its lateral limits. When moved to a lateral limit, the shaft 5 depresses the corresponding switch and causes tracking signals (for that specific direction) to be continuously generated. Accordingly, the on-screen object will move to its lateral limit in that direction even though the roller 3 has previously reached its own limit.

To enable cursor positioning, command activation and the like, the roller 3, which is entirely situated on the platform 4 in the preferred embodiment, is simply pushed downwards to activate any of the contact switches underneath the platform 4. To prevent inadvertent activation during manipulation of the roller 3, a biasing member such as a spring is interposed between the bottom of the platform 4 and the keyboard 1 such that a proper amount of pressure on the platform 4 is required for activation. Similarly, frictional inhibitor means may be employed at the connections between the shaft and guides to prevent excessive rotational and translational (sliding) movement of the roller 3 with respect to the platform 4.

According to the above-description of the present invention, the pointing device is well suited for use as a cursor control device since the user need not remove his fingers from their natural position on the keyboard 1 to control movement of the on-screen object. This is because the placement and manner of manipulating the device permits the user to use either one or both of his thumbs to control the rotation and sliding of the roller 3 as well as depressing of the platform 4 for command activation. Furthermore, the linear shape in addition to the relatively small size of the device (i.e., approximately that of a normal space bar on a keyboard 1) enables it to be implemented without any significant increase in the surface area of the keyboard 1, thereby making it especially advantageous for use in notebook computers as shown in FIG. 4.

Figure 4:
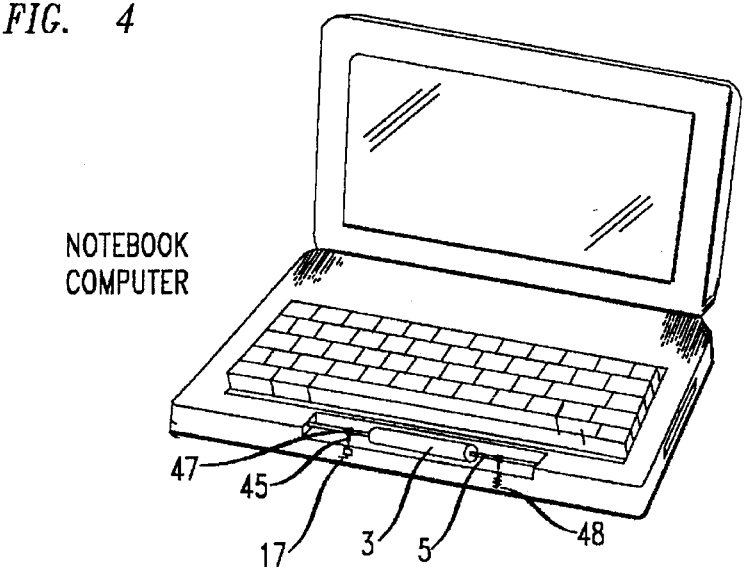
FIG. 4 is a diagram showing a notebook computer having the roller without the platform assembly incorporated within the keyboard.

According to an alternate embodiment of the present invention shown in FIG. 4, the roller 3 and associated support shaft 5 are implemented within the recess of the keyboard housing 1 without use of the platform 4. As shown in FIG. 4, the support shaft 5 is supported within the recess by means of guides forming vertical stems 45 protruding from the bottom of the recess. The top end of the stems 45 are preferably adapted with eyelets 47 for rotatably receiving the support shaft 5 of the roller 3, however, the roller 3 may also be rotatably coupled to the shaft 5 which itself is fixed to the vertical stems 45. To enable command activation, at least one of the stems has its bottom end coupled to a contact switch 17 disposed within the keyboard housing 1, while the other stem 45 is either fixed in place or has a biasing spring 48 attached to its bottom end for allowing reciprocal movement of the stem 45.

Figure 5:
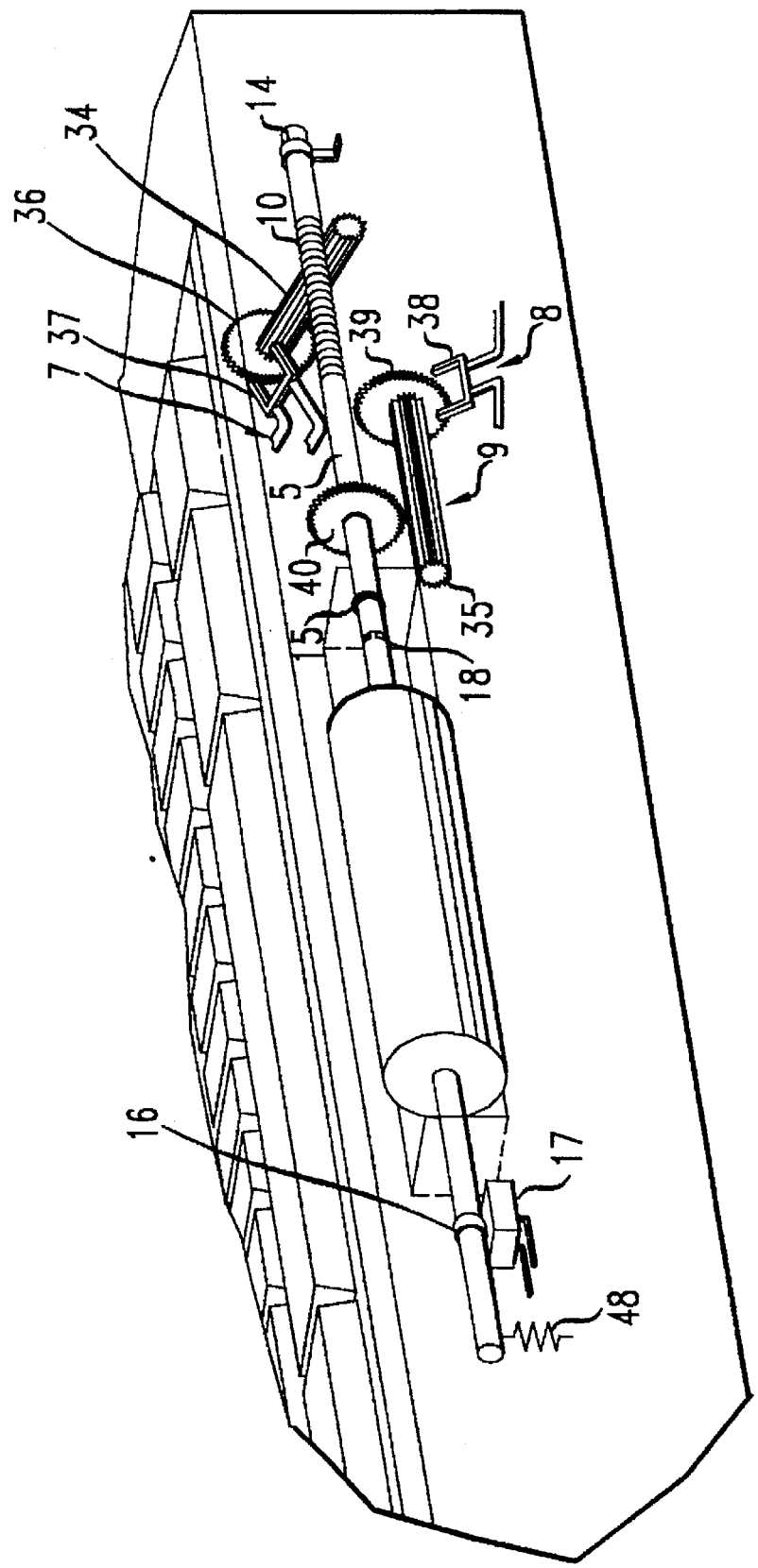
FIG. 5 is a diagram showing the roller of FIG. 4 implemented within the keyboard by means of three guides and a universal joint.

In a variant of this embodiment, shown in FIG. 5, the support shaft 5 is supported by three guides 14, 15, 16, with the first (right end) guide 14 and second (middle) guide 15 disposed at a first end of the roller 3 such that the threaded and ridged portions of the shaft 5 are interposed between the two guides 14, 15. The third (left end) guide 16 is disposed at the second end of the shaft 5 on the opposite side of the roller 3 and has a base coupled to a contact switch 17 for enabling command activation. To enable pivotal movement of the support shaft for operation of the contact switch 17, a universal joint 18, or other articulated joint, is provided in the shaft between the second (middle) guide 15 and the proximate end of the roller 3. In this manner, the first and second guides 14, 15 provide for stabilized rotational and translational movement of the shaft 5, while the universal joint 18 enables the second end of the shaft 5 (including the roller 5) to be pivoted towards the contact switch 17 for activation. Again, a biasing force in the form of a spring 48 is provided under the second end of the shaft 5 to bias the roller 3 in a non-contactual position.

In another variant of this alternate embodiment (not shown), the roller and support shaft are again supported within the recess of the keyboard housing without use of a support platform, but in this case, command activation is accomplished using a contact switch or push-button separate from the moving parts of the device. The button is preferably disposed on the keyboard housing proximate to the pointing device, either on top of or on the side of the keyboard housing. Alternately, however, the command button can be placed proximate to either the tab or return keys of the keyboard for facilitated use by the pinky of either hand.

With each of the above-described embodiments, the exact placement of the pointing device (i.e. the roller 3) can be moved from the corner position of the lower edge of the keyboard to a position either entirely on top of or entirely on the lower side-face of the keyboard housing 1. Again, a generally rectangular or arcuate recess is formed at either location proximate and parallel to the space bar (and within reaching distance of the user's thumb).

Figure 6:
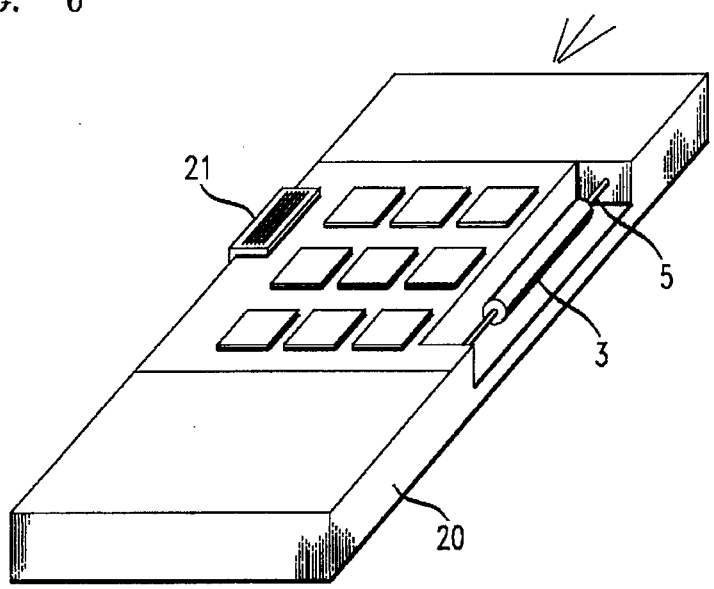
FIG. 6 is a diagram showing a remote control with the roller of the present invention incorporated therein.

Finally, since the pointing device of the present invention is extremely versatile, it can be adapted for use in other applications other than cursor control for a computer system. In the embodiment shown in FIG. 6, the device is adapted for use with a remote control unit 20, which in the near future is expected to be the primary control interface for the "information superhighway" to be accessed via the user's television monitor. To enable on-screen object control in the home entertainment environment, the device is preferably implemented in either the top right or top left edge of the remote control unit 20. In one variant (not shown), the device may comprise a platform and corresponding contact switches at either one or both sides of the platform. More preferably, however, the device comprises only the roller 3 and shaft 5 combination with a separate command activation button 21 disposed on the opposite side of the remote control unit 20 as is shown in FIG. 6. In this manner, only one hand is needed to manipulate the roller in a rotational and/or translational movement (using a thumb) and to activate the command button (using an index finger).

Figure 7:
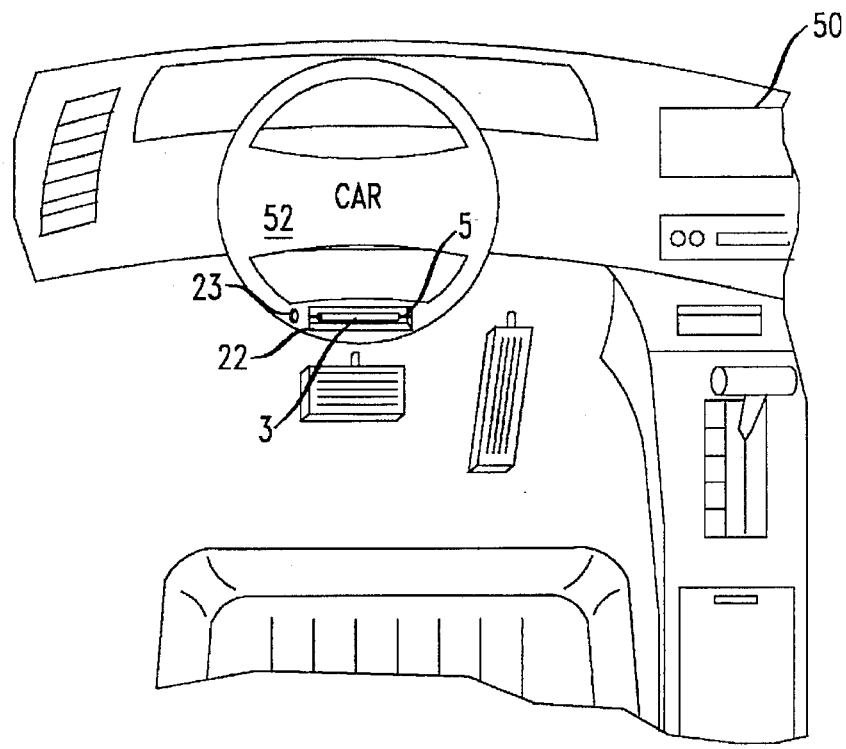
FIG. 7 is a diagram showing the roller of the present invention incorporated within the steering wheel of an automobile.
Figure 8:
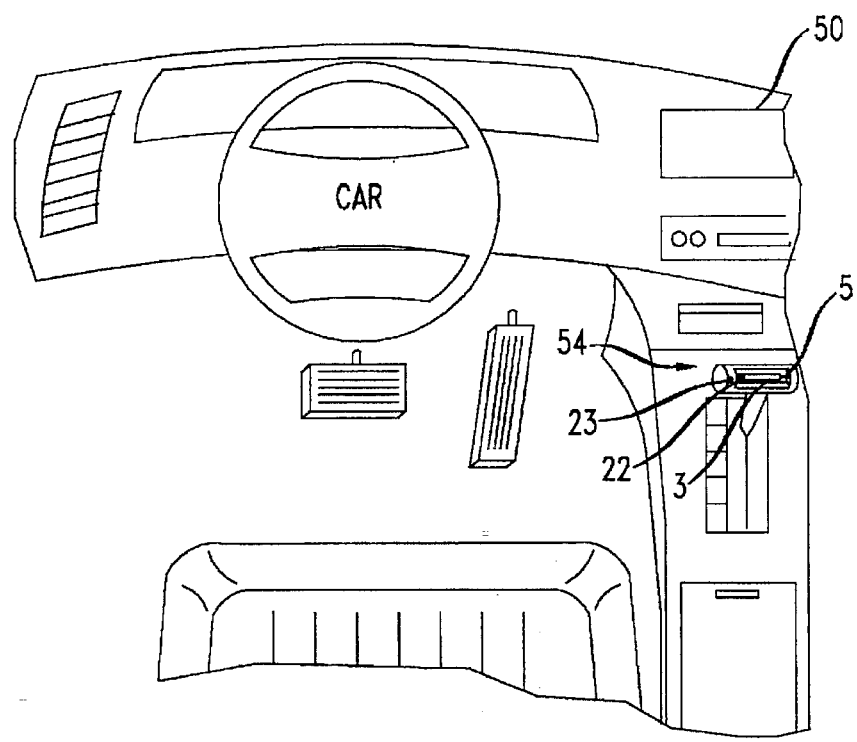
FIG. 8 is a diagram showing the present invention incorporated within the shifting lever of an automobile.

In the alternate embodiment shown in FIG. 7, the device may also be advantageously used in an automobile for control of movable components, such as a seat or mirror, or alternatively, for selection among variable settings, such as air temperature and radio stations. Control over movable components may be performed by directly corresponding the rotation and sliding of the roller with movement of the component, whereas selection of an appropriate setting on a control panel display 50 is performed by means of cursor control similar to that used with a computer system. With reference to FIG. 7, the device is preferably implemented within a recess 22 formed in the steering wheel 52. In this embodiment, command activation is performed according to one of the above-described variants as shown in FIGS. 1 and 5, or by use of a separate command button 23 placed either proximate to the recess to enable use entirely by one hand or on the opposite side of the recess for manipulation by the user's other hand. Alternately, however, the device may further be implemented (as is shown in FIG. 9) within a recess 22 formed in the automobile's shifting lever 54 so that it can be manipulated without interfering with the driver's steering ability.

It will be recognized that the above described invention may be embodied in many other specific arrangements and combinations not explicitly set forth above and may be used in a plurality of applications where control over the positioning or movement of an on-screen object or a three dimensional object is desired. Thus, it is understood that the invention is not to be limited by the foregoing illustrative details, but rather is to be defined by the appended claims.

I claim:

1. A pointing and/or directional control device having a housing and comprising:

a substantially cylindrical roller having a circumferential surface and a longitudinal axis, the roller rotatably supported within a recess formed in the housing of the control device and being rotatably and translationally manipulable as a whole about and back and forth along the longitudinal axis of the roller;

a first motion sensor coupled to the circumferential surface of the roller by one of a mechanical and an optical coupling for detecting the magnitude and direction of roller translation; and a second motion sensor coupled to the circumferential surface of the roller by one of a mechanical and an optical coupling for detecting the magnitude and direction of roller rotation.

2. The pointing and/or directional control device of claim 1, wherein the mechanical coupling between the first sensor and the roller comprises a first gear in contact with the circumferential surface of the roller to cause rotational movement of the first gear upon translation of the roller laterally as a whole from end to end, wherein the mechanical coupling between the second sensor and the roller comprises a second gear in contact with the circumferential surface of the roller to cause rotational movement of the second gear upon rotation of the roller, and wherein the first gear has a rotational axis perpendicular to the longitudinal axis of the roller and the second gear has a rotational axis parallel to the longitudinal axis of the roller.

3. The pointing and/or directional control device of claim 1, wherein the optical couplings between the first and second sensors and the roller comprise optical sensors adapted with different color filters for detecting grid patterns of different colors imprinted on the circumferential surface of the roller, the grid patterns comprising vertical lines of a first color applied to the circumferential surface orthogonally to the longitudinal axis of the roller and horizontal lines of a second color applied to the circumferential surface parallel to the longitudinal axis of the roller.

4. The directional control device of claim 1, wherein the device further comprises left and right contact switches disposed in the housing at left and right opposite ends of the roller, respectively, the contact switches being coincident with the longitudinal axis of the roller and coupled to respective signal generators for generating left and right tracking signals, respectively, when the left and right opposite ends of the roller make contact with the left and right contact switches, respectively.

5. A pointing and/or directional control device having a housing and comprising:
 a substantially cylindrical roller rotatably supported within a recess formed in the housing of the control device and being rotatably and translationally manipulable as a whole about and back and forth along the longitudinal axis of the roller;
 a first translational decoder rod passing through the roller coincident with the longitudinal axis of the roller;
 a first rotational sensor coupled to the first rod via one of a mechanical coupling and an optical coupling for detecting translational movement of the roller;
 a second rotational sensor coupled to the first decoder rod via one of a mechanical coupling and an optical coupling for detecting rotational movement of the roller; and
 the first translational decoder rod being supported by first and second vertical stems disposed at opposite ends of the roller, with at least one of the first and second stems biased above a contact switch and being movable up and down to cause activation of the switch by depressing the roller.

6. The directional control device of claim 5, wherein both the first and second stems are biased above respective contact switches for activation of one or both of the switches upon depressing of one or both opposite ends of the roller, respectively.

7. The directional control device of claim 5, wherein only one of the first and second stems is biased above a contact switch, and the first rod comprises one of an articulated joint and a universal joint disposed in the first rod between the roller and the stem not biased above a contact switch.

8. The directional control device of claim 5, wherein a platform is interposed between the first and second stems and the contact switch, with the stems coupled to the platform and the platform biased above the contact switch to cause activation of the switch upon depressing the roller.

9. The directional control device of claim 5, wherein the first rotational sensor is coupled to the first rod via gearing comprising one of threading and ridges disposed circumferentially about the longitudinal axis of the first rod, and the second rotational sensor is coupled to the first rod via gearing comprising ridges disposed longitudinally along one of the first and second rods for detecting rotational movement of the roller.

10. The directional control device of claim 9, wherein both the first and second stems are biased above respective contact switches for activation of one or both of the switches upon depressing of one or both opposite ends of the roller, respectively.

11. The directional control device of claim 9, wherein only one of the first and second stems is biased above a contact switch, and the first rod comprises one of an articulated joint and a universal joint disposed in the first rod between the roller and the stem not biased above a contact switch.

12. The directional control device of claim 9, wherein a platform is interposed between the first and second stems and the contact switch, with the stems coupled to the platform and the platform biased above the contact switch to cause activation of the switch upon depressing of the roller.

13. The directional control device of claim 5, wherein the device comprises an input control device for a computer system to control movement and positioning of a cursor displayed on a computer monitor, with the housing of the device forming a keyboard housing having a plurality of keys including a spacebar key, with the recess encompassing the roller formed in the keyboard housing proximate and substantially parallel to the space bar key.

14. The directional control device of claim 5, wherein the device comprises an input control device for a computer system having a keyboard with a spacebar key to control movement and positioning of a cursor displayed on a computer monitor, and the housing of the device forming a wrist support disposed adjacent to the keyboard and having the recess encompassing the roller formed in a surface of the wrist support proximate to the spacebar key of the keyboard.

15. A pointing and/or directional control device having a housing and comprising:
 a substantially cylindrical roller rotatably supported within a recess formed in the housing of the control device and being rotatably and translationally manipulable as a whole about and back and forth along the longitudinal axis of the roller;
 a first translational decoder rod passing through the roller coincident with the longitudinal axis of the roller, the first rod having a first section with gearing comprising one of circumferential threading and circumferential ridges disposed about the longitudinal axis of the roller;

a first rotational sensor coupled to the gearing of first rod for detecting translational movement of the roller;

a second rotational decoder rod having a longitudinal axis substantially parallel to and mechanically engaged with the first rod;

a second rotational sensor coupled to the second decoder rod for detecting rotational movement of the roller; and one of the first and second decoder rods having a toothed wheel affixed thereto about the longitudinal axis of the one decoder rod, and the other of the decoder rods having a circumferential surface adapted with longitudinal ridges for receiving the teeth of the toothed wheel, the longitudinal ridges being of sufficient length along the other decoder rod to enable the toothed wheel and the roller to move back and forth within a selected distance.

16. The directional control device of claim 15, wherein the device further comprises left and right contact switches disposed in the housing at left and right opposite ends of the roller, respectively, the contact switches being coincident with the longitudinal axis of the first rod and coupled to respective signal generators for generating left and right tracking signals, respectively, when the left and right opposite ends of the first rod make contact with the left and right contact switches, respectively.

* * * * *